(12) United States Patent
Kwon et al.

(10) Patent No.: US 9,491,202 B2
(45) Date of Patent: Nov. 8, 2016

(54) DEVICE AND METHOD CAPABLE OF SEARCHING FOR AVAILABLE SERVICE

(71) Applicant: Samsung Electronics Co., Ltd., Gyeonggi-do (KR)

(72) Inventors: Hyuk-Choon Kwon, Seoul (KR); Soo-Yeon Jung, Seoul (KR); Ho-Dong Kim, Seoul (KR); Hae-Young Jun, Seoul (KR); Seung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 605 days.

(21) Appl. No.: 13/717,090

(22) Filed: Dec. 17, 2012

(65) Prior Publication Data

US 2013/0159537 A1  Jun. 20, 2013

(30) Foreign Application Priority Data

Dec. 16, 2011 (KR) .......... 10-2011-0136171

(51) Int. Cl.
*G06F 15/16* (2006.01)
*H04L 29/06* (2006.01)
*H04L 29/08* (2006.01)

(52) U.S. Cl.
CPC ......... *H04L 65/1066* (2013.01); *H04L 67/141* (2013.01); *H04L 67/16* (2013.01)

(58) Field of Classification Search
CPC ............... H04L 29/08396; H04L 29/08441; H04L 65/1066; H04L 67/141; H04L 67/16
USPC ........ 709/217, 219, 220, 223, 226, 227, 228
See application file for complete search history.

(56) References Cited

U.S. PATENT DOCUMENTS

| | | | |
|---|---|---|---|
| 7,035,915 B1 * | 4/2006 | Huo et al. ............... | 709/219 |
| 7,720,976 B2 * | 5/2010 | Chu et al. ............... | 709/227 |
| 8,285,860 B2 * | 10/2012 | McGuire et al. ......... | 709/228 |
| 2004/0064693 A1 * | 4/2004 | Pabla .................. | H04L 63/02 713/168 |
| 2007/0019586 A1 * | 1/2007 | Nanda ................. | H04W 48/16 370/335 |
| 2010/0118834 A1 * | 5/2010 | Kalhan ................ | H04W 48/08 370/336 |

* cited by examiner

*Primary Examiner* — Viet Vu
(74) *Attorney, Agent, or Firm* — The Farrell Law Firm, P.C.

(57) ABSTRACT

A method capable of searching for a surrounding device based on a desired service is provided. The method includes transmitting a service search request including information regarding a target service to nearby devices; receiving a service search response from the nearby device supporting the target service; analyzing service information of the nearby device supporting the target service, which is included in the service search response; selecting the nearby device supporting the target service based on a result of the analyzed service information; and performing the target service by establishing a session with the selected device.

14 Claims, 8 Drawing Sheets

DEVICE AND METHOD CAPABLE OF SEARCHING FOR AVAILABLE SERVICE

PRIORITY

This application claims priority under 35 U.S.C. §119(a) to a Korean Patent Application filed in the Korean Intellectual Property Office on Dec. 16, 2011 and assigned Serial No. 10-2011-0136171, the entire disclosure of which is incorporated herein by reference.

BACKGROUND OF THE INVENTION

1. Field of the Invention

The present invention relates generally to a service search device and method, and more particularly, to a service search device and method for searching for an available service between devices without forming a network between such devices.

2. Description of the Related Art

Devices in a short-range communication network search for the functions available on other devices. To search for a device and its supportable service function information, search protocols of Layer 3 or higher in the Open Systems Interconnection (OSI) 7 Layer have been used. An example of such a search, service search process in Wi-Fi and Bluetooth, which are short-range communication protocols, will be described below.

To search for a service based on the Wi-Fi or Bluetooth protocols, two or more devices first form a network by connecting with one another. For example, a network is formed by directly connecting a smartphone to another smartphone, a laptop computer to a mouse, or a tablet Personal Computer (PC) to a printer. A network can also be formed by connecting a device to a nearby device, such as a digital camera, an MP3 player, a game console, and a TV.

Thus, if a user wants to search for a service using a user device that is not a part of a network, the user device must join a previously formed network or form a new network with the other devices. To this end, the user device must perform a series of processes including searching for an already formed network and joining the already formed network. Moreover, in the case of a Basic Service Set (BSS) of Wi-Fi, the user device must join the network via a connection with an Access Point (AP).

As such, the user device does not search for an available service until it obtains information regarding devices in a network after forming a new network or after joining an existing network.

As described above, the process of determining a service supportable by a device starts after a connection of two layers, such as PHYsical (PHY) and MAC layers, to the device is set in advance. If it is determined that the device does not satisfy a user's service requirements, the user needs to disconnect the previously established two-layer connection to the device, and make another two-layer connection to another device to search for a service supportable by another device.

As such, this mechanism in which all devices are connected via peer-to-peer protocols to one another in the PHY and MAC layers without an AP is inefficient. Specifically, when the number of devices in a network is in the hundreds, this connection setup process results in large overhead.

Thus, a method capable of searching for a service supportable by a device without forming a new network is required to increase network efficiency and improve the user experience.

SUMMARY OF THE INVENTION

Accordingly, the present invention has been made to solve the above-stated problems occurring in the prior art, and an aspect of the present invention provides a device and method for searching for nearby devices based on a service desired to be efficiently used.

Another aspect of an embodiment of the present invention is to provide a device and method for searching for an available service without forming a network between devices.

In accordance with one aspect of the present invention, a method of searching for a nearby device based on a service in a device is provided. The method includes transmitting a service search request including information regarding a target service to nearby devices; receiving a service search response from the nearby device supporting the target service; analyzing service information of the nearby device supporting the target service, which is included in the service search response; selecting the nearby device supporting the target service based on a result of the analyzed service information; and performing the target service by establishing a session with the selected device.

In accordance with another aspect of the present invention, a method of searching for a nearby device based on a service in a device is provided. The method includes receiving a broadcasting signal from each of nearby devices; analyzing service information included in the broadcasting signal; searching for the nearby device supporting a target service based on a result of the analyzed service information; and performing the target service by establishing a session with the searched device.

In accordance with another aspect of the present invention, a device for searching for a nearby device based on a service is provided. The device includes a connection unit for transmitting a service search request including information regarding a target service to nearby devices and receiving a service search response from the nearby device supporting the target service from among the nearby devices; and a controller for analyzing service information of the nearby device supporting the target service, which is included in the service search response, selecting the nearby device supporting the target service based on a result of the analyzed service information, and performing the target service by establishing a session with the selected device.

In accordance with another aspect of the present invention, a device for searching for a nearby device based on a service is provided. The device includes a connection unit for receiving a broadcasting signal from each of nearby devices; and a controller for analyzing service information included in the broadcasting signal, searching for the nearby device supporting a target service based on a result of the analyzed service information, and performing the target service by establishing a session with the searched device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention will now be described in detail with reference to the accompanying drawings. Like reference numbers are used to refer to like elements throughout the drawings. Moreover, in the following description, well-known functions are not described in detail since they would obscure the invention with unnecessary detail.

In the detailed description below, embodiments of the present invention to achieve the above-described technical aspects are provided. In addition, for convenience of description of the present invention, although names of objects defined in a Device-to-Device (D2D) service are used, this standard and the names do not limit the scope of the present invention, and the present invention is also applicable to systems having other technical characteristics.

The present invention provides a method of searching for a nearby device based on a service to be used. To this end, according to the present invention, a user device acquires service information by using broadcasting signals received from nearby devices or a response to a transmission of a service search request, determines, based on the acquired service information, whether there is a device supporting a desired service, and if there is a device supporting a desired service, selects the device supporting the desired service to use the desired service through a connection to the selected device. By doing so, the user device is connected only to the device supporting the desired service, so an optimized session connection setup process is performed, enabling efficient management with respect to the total network capacity.

An operation of a device in which the above-described function is implemented is described with reference to FIG. 1.

Figure 1:
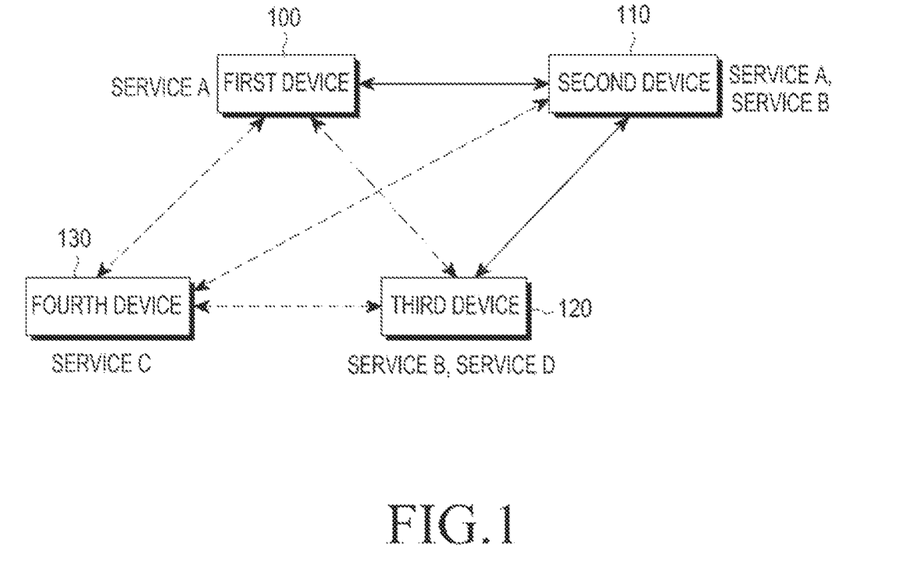
FIG. 1 illustrates a configuration of a Device-to-Device (D2D) network according to an embodiment of the present invention.

FIG. 1 illustrates a D2D network according to an embodiment of the present invention. Referring to FIG. 1, first, second, third, and fourth devices 100, 110, 120, and 130, respectively. The four devices 100, 110, 120 and 130 individually provide and use at least one of services A, B, C, and D in a D2D available service area. Thus, when the first device 100 desires to use the service A, the first device 100 connects to the second device 110, and for service B, only a connection between the second device 110 and the third device 120 is required. Accordingly, if a device supporting a service to be used is searched for, a session is connected with only the searched device. However, since the first device 100 and the fourth device 130 use different services, there is no need to form a network between the devices.

Hereinafter, the embodiments of the present invention disclosed in the detailed description of the present invention are divided as described below. A first embodiment of the present invention includes, when a user device starts searching for a service to be used, i.e., a target service, receiving, by the user device, broadcasting signals from nearby devices to acquire information regarding services supported by the nearby devices and performing a session connection with a desired device based on the acquired information. A second embodiment of the present invention includes transmitting, by a user device, a service search request to nearby devices to directly search for a device supporting a target service and performing a session connection with a device responding to the service search request. By doing so, a device having a desired service can be found without previously forming a network with that device, so an optimized session connection process is performed.

Figure 2:
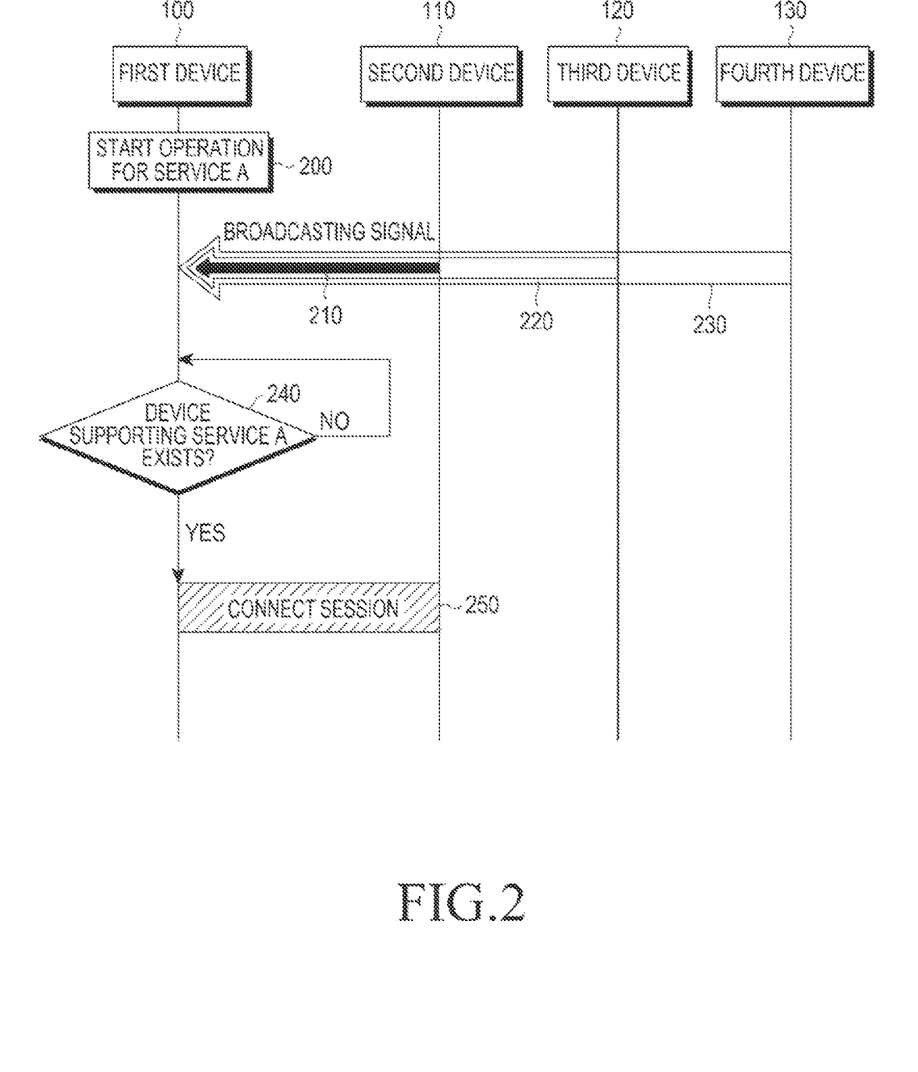
FIG. 2 illustrates a signaling diagram between devices for a service search according to an embodiment of the present invention.

First, a service search process according to the first embodiment of the present invention is described with reference to FIG. 2. FIG. 2 illustrates a method of searching for a device supporting the service A from among a plurality of devices located in the D2D available service area when a user of the first device 100 wants to use the service A. The range of the D2D available service area reaches a maximum radius of several miles from the first device 100.

Referring to FIG. 2, when the first device 100 starts searching for service A in step 200, the first device 100 receives broadcasting signals including service information from nearby devices, e.g., the second, third, and fourth devices 110, 120, and 130, in steps 210 to 230. In a system supporting D2D according to an embodiment of the present invention, a broadcasting signal is a beacon signal. Additionally, although the broadcasting signals are received after the service, A begins searching for the service in response to a user's start request of service A in the above description, the broadcasting signals are received as soon as the first device 100 enters a specific D2D available service area, e.g., a building supporting a D2D service.

Specifically, the service information included in each broadcasting signal includes device identification information, available service information, version information, and intention information. The device identification information is temporary identification information for identifying a device, the available service information indicates a currently-used service from among several supportable services, such as a data sync service, an Audio/Video (A/V) streaming service, and a messaging service, the version information indicates service category version information, and the intention information indicates providing intention for a service category table to be transmitted to another device For example, as shown in FIG. 1, when the second device 110 supports services A, B, and C and is currently using service A, service A is included as available service information of a broadcasting signal. If currently available services are services A and B, the second device 110 transmits a broadcasting signal including information regarding services A and B. A detailed configuration of the service information is provided below.

In FIG. 2, it is assumed that a broadcasting signal from the second device 110 includes information regarding service A, a broadcasting signal from the third device 120 includes information regarding service B, and a broadcasting signal from the fourth device 130 includes information regarding service C.

Upon receiving the broadcasting signals, the first device 110 determines in step 240 based on the service information included in the broadcasting signals whether there is a device supporting service A. If it is determined that the device supporting service A is the second device 110, the first device 110 creates a session with the second device 110 in step 250.

According to the current embodiment, the broadcasting signals from the second, third, and fourth devices 110, 120, and 130, respectively, are transmitted based on the following scheduling methods. A first method is one of simultaneously distributing beacon signals in the second, third, and fourth devices 110, 120, and 130 at a constant period. A second method is one of periodically distributing a beacon signal in each of the second, third, and fourth devices 110, 120, and 130 according to a previously scheduled method. A third method is one of distributing a beacon signal in a previously allocated specific interval based on a contention method of the second, third, and fourth devices 110, 120, and 130, which is a method for randomly distributing the beacon signals, since there is no specific order set in each device within the previously allocated specific interval.

Figure 3:
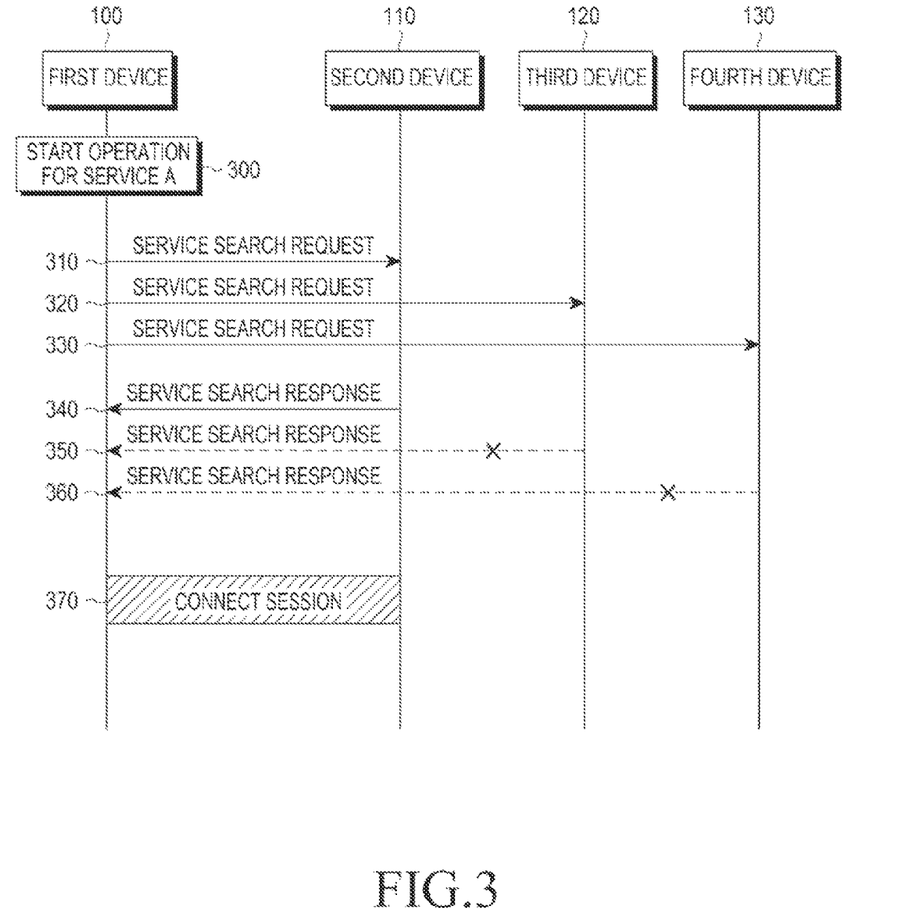
FIG. 3 illustrates a signaling diagram between devices for a service search according to an embodiment of the present invention.

Next, a service search process, according to the second embodiment of the present invention, is described with reference to FIG. 3. FIG. 3 illustrates an operation based on an information request and response of a service supported by each device.

Referring to FIG. 3, when the first device 100 begins searching for service A in step 300, the first device 100 transmits a service search request to nearby devices, e.g., the second, third, and fourth devices 110, 120, and 130, respectively, in steps 310 to 330 to search for services supported by the second, third, and fourth devices 110, 120, and 130. The service search request includes service information of the first device 100. Specifically, like the first embodiment of the present invention, the service information includes identification information, a currently-used service, service category version information, and service category table providing intention information of the first device 100. As described above, the first device 100 transmits a service search request including the service information of the first device 100 to the nearby devices, i.e., the second, third, and fourth devices 110, 120, and 130, respectively, to inform them of the service information of the first device 100.

Upon receiving the service search request, each of the second, third, and fourth devices 110, 120, and 130, respectively, analyzes the service information included in the service search request. If it is determined that the second device 110 can support a service requested by the first device 100, e.g., the service A, the second device 110 transmits a service search response including service information of the second device 110 to the first device 100 in step 340. If the third and fourth devices 120 and 130 do not support the service A even though the third and fourth devices 120 and 130 receive the service search request, the third and fourth devices 120 and 130 do not transmit a service search response in steps 350 and 360. Accordingly, the first device 100 connects a session with the second device 110 based on the service search response received from the second device 110.

If the third device 120, in addition to the second device 110, also supports the service A, the third device 120 also transmits a service search response to the first device 100. Then, the first device 100 receives a plurality of service search responses. In this case, the first device 100 tries to make a session connection in the order of reception of the service search responses. Alternatively, the first device 100 first tries to make a session connection with a device, which has transmitted a service search response including the lowest service category level as a detailed service type from among the multiple received service search responses. For example, when the second device 110 transmits a service search response having a level 1 corresponding to the highest service category level and the third device 120 transmits a service search response having a level 2 corresponding to an intermediate service category level, the first device 100 first makes a session connection with the third device 120 and then makes a session connection with the second device 110. These service category levels are described below. When a plurality of service search responses are received by the first device 100, a user of the first device 100 selects a desired device from among several devices, which have transmitted the plurality of service search responses.

An operation and components of the first device 100 in which the above-described functions are implemented are described with reference to FIG. 4.

Figure 4:
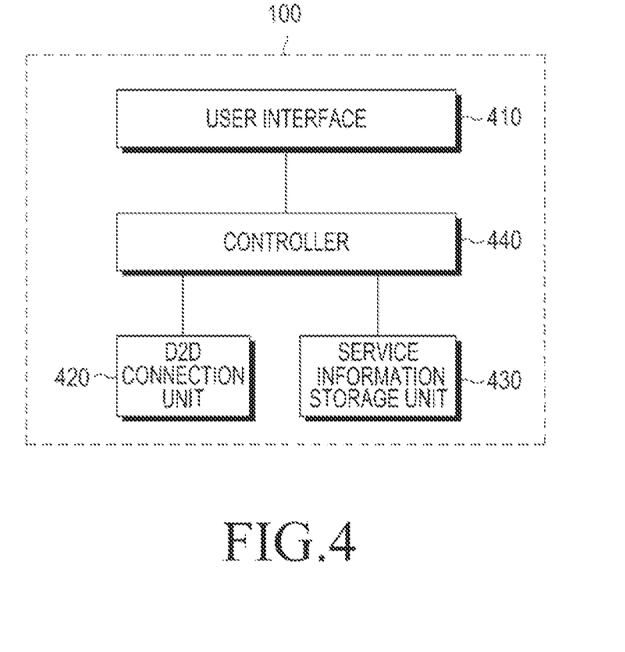
FIG. 4 illustrates a block diagram of a device according to an embodiment of the present invention.

Referring to FIG. 4, the first device 100 includes a user interface 410, a D2D connection unit 420, a service information storage unit 430, and a controller 440. The first device 100 corresponds to any one of D2D service supporting devices, such as a smartphone, a cellular phone, a digital camera, an MP3 player, a game machine, a TV, a display device, a vehicle head unit, and the like.

The user interface 410 is an input means used for a user to select a desired service. If a plurality of devices supporting the selected service are searched, the user selects a desired device through the user interface 410.

The D2D connection unit 420 searches for nearby devices supporting the desired service.

The service information storage unit 430 stores information regarding services supported by the first device 100, and the service information is stored in tabular form. Additionally, if service information is acquired from nearby devices, the acquired service information is also stored in the service information storage unit 430.

Specifically, IDentification (ID) information of the first device 100, which is included in the service information stored in the service information storage unit 430, is set to be different from ID information of nearby devices recognized by means of broadcasting signals. The ID information of the first device 100 is temporary ID information used in a local area in which the D2D service is performed and indicates an ID used for only a connection to the nearby devices.

Thus, since the ID information of the first device 100 is discarded once it is used in the local area, the ID information of the first device 100 is newly created when the first device 100 tries a connection in another local area or when the first device 100 tries a reconnection in the same local area. The ID information uses approximately 2 octets allocated according to an embodiment of the present invention, and since the ID information is temporary, the ID information provides a privacy function in which information can be provided only if the user opens the ID information to the public.

Additionally, supportable services in the service information are stored in a list form. These supportable services are classified based on the service types or portal sites.

First, service categories are classified depending on service types as shown in Table 1.

TABLE 1

| Level 1 | Level 2 | Level 3 |
|---|---|---|
| Communication | Messaging | SMS |
| | | MMS |
| | | IM |
| | | Group MS |
| | | E-mail |
| | Call | VoIP Call |
| | | Video Call |
| | | Group Call |
| Information | Traffic Service | Map |
| | | Navigation |
| | Local info. service | Local Event |
| | | Local weather |
| | | News |
| | | Notice |
| Entertainment | Data service | File Transfer |
| | | Multimedia Streaming |
| | Game | Real-time game |
| Business | Shopping | Shopping |
| | Advertisement | Advertisement |
| | Coupon | Coupon |
| | Banking | Banking |
| Emergency | Emergency | Emergency |

In Table 1, the service types are classified into levels, i.e., in a hierarchical order from the highest level to the lowest level. The service category table shown in Table 1 is only an example, and a configuration of the service category table varies based on available devices. That is, each device has a unique service category table including active services, which indicate services being executed on a background and currently used, and inactive services, which indicate services installed but not executed.

Next, service categories are classified based on portals as shown in Table 2.

TABLE 2

| Level 1 | Level 2 |
|---|---|
| NAVER | Messaging |
| | Call |
| | Traffic Service |
| | Local info. Service |
| | Data Sharing |
| | Game |
| | Shopping |
| | Advertisement |
| | Coupon |
| | Banking |
| | Emergency |
| DAUM | |
| SAMSUNG | |
| APPLE | |
| GOOGLE | |
| SKT | |
| KT | |
| U+ | |

In Table 2, if service categories are classified based on portals, when the first device 100 transmits a service search request, the first device 100 inserts information that a service, e.g., a group game (e.g., soccer game) provided by NAVER (a search engine), from among supportable services is being executed by the first device 100 into the service information and informs the nearby devices of the service information.

Service category version information included in the service information indicates version information of a service category table stored in the first device 100. The service category table has a table type categorized with levels 1 to 3 as shown in Table 1 and 2 and is stored in each device.

Moreover, the service category table is distributed and continuously managed and updated by D2D service providers.

Intention information included in the service information indicates providing intention for the service category table as shown in Table 1 and 2.

The controller 440 searches for a device that can support a target service, from among the nearby devices. Starting the search occurs, for example, when a search request for a desired service is input from the user through the user interface 410 or when the first device 100 is turned on. To search for a device that can support a target service, the controller 440 receives broadcasting signals from the nearby devices, or transmits a service search request to the nearby devices and receives responses according to the service search request from the nearby devices. If a device supporting the target service is searched for, the controller 440 makes a session connection with the searched device.

Each of the broadcasting signals includes information regarding a currently-used, i.e., active, service based on a format as shown in Table 1 and 2. This active service information is carried on a beacon signal, and accordingly, the controller 440 determines in what level of service category table supportable service information is included in the beacon signal. This is described in detail with reference to FIGS. 5A to 5C. If the most detailed service information is level 3 and a nearby device transmits active service information based on level 3, service information representing all detailed services that are level 3 of Table 1 is carried on the beacon signal. For example, when the active services are Short Message Service (SMS), Multimedia Message Service (MMS), and Instant Messaging (IM), a beacon signal is transmitted three times to inform of service information of the active services. To reduce overhead, the beacon signals are scheduled in advance. These beacon signals are represented in a frame format as shown in FIGS. 5A to 5C.

Figure 5A:
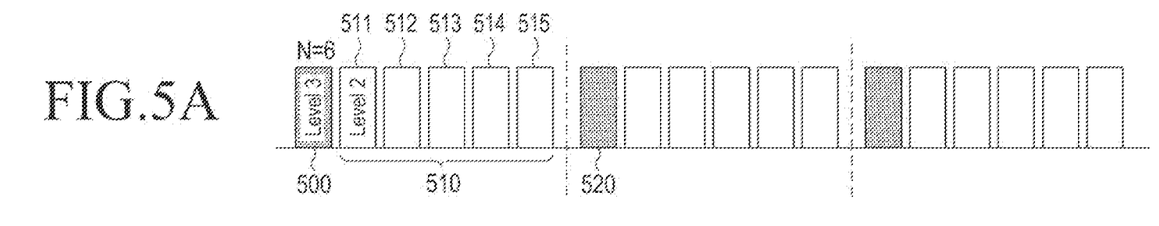
FIGS. 5A to 5C illustrate frames based on service category levels according to an embodiment of the present invention.
Figure 5B:
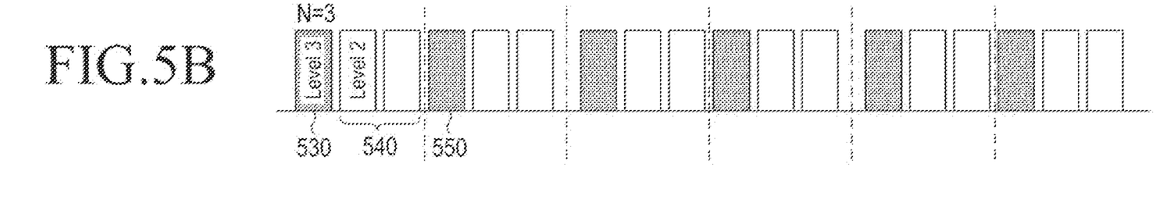
Figure 5C:
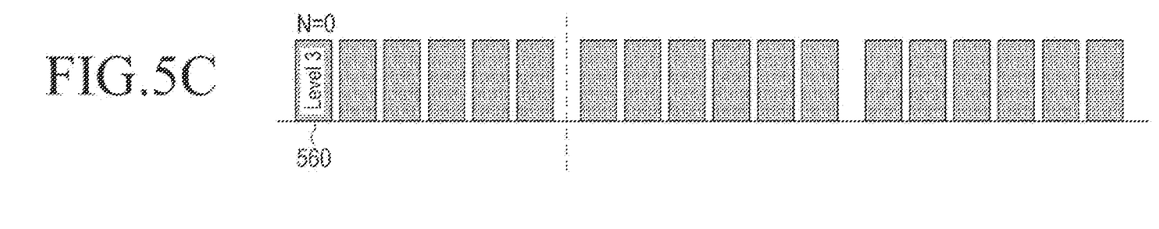

FIG. 5C illustrates a case in which active service information corresponding to level 3 is carried on every frame, i.e., every beacon signal 560. Specifically, referring to Table 1, since service names of SMS, MMS, and IM correspond to level 3, if the first device 100 desires to search for a device supporting SMS, the first device 100 checks a service name of SMS from a beacon signal. Although overhead is increased by receiving a beacon signal including the service name of SMS, a beacon signal including a service name of MMS, and a beacon signal including a service name of IM, a device desiring to search for a target service can acquire detailed service information anytime if necessary, thereby easily finding the target service and a device supporting the target service.

FIG. 5A illustrates a case in which only a first frame 500 includes active service information corresponding to level 3, second to sixth frames 510 include active service information corresponding to level 2, and a first frame 520 of a next period includes active service information corresponding to level 3.

FIG. 5B illustrates a case in which only a first frame 530 includes active service information corresponding to level 3, second and third frames 540 include active service information corresponding to level 2, and a fourth frame 550 includes active service information corresponding to the level 3.

Figure 6:
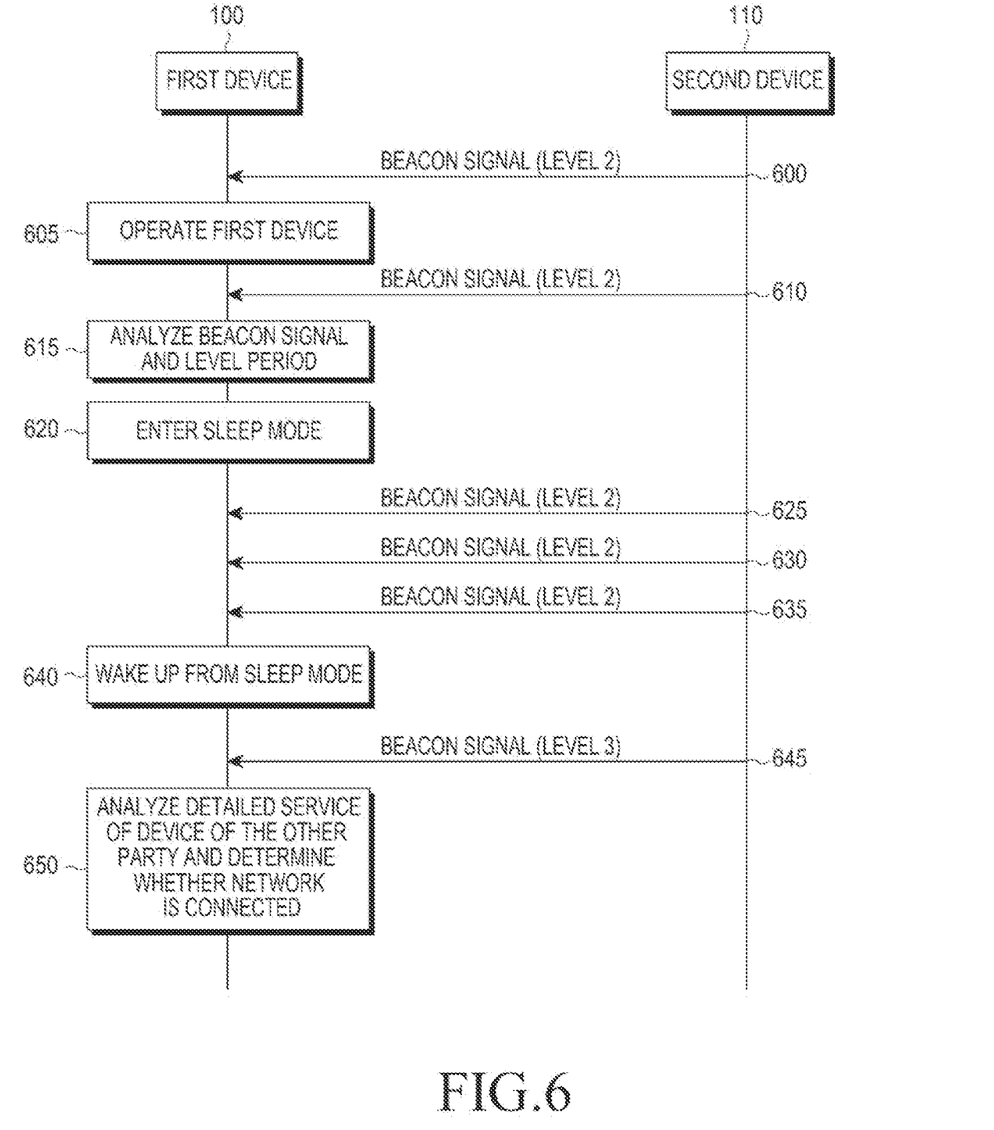
FIG. 6 illustrates a signaling diagram between devices based on a service category level according to an embodiment of the present invention.

An operation of the first device 100 when such beacon signals are received is described with reference to FIG. 6. When the first device 100 receives a beacon signal corresponding to level 3 as shown in FIG. 5A to search for a device supporting a target service, the first device 100 directly finds a desired device and form a D2D network by connecting a session with the desired device.

However, the first device 100 operates in step 605 after receiving a first beacon signal 511 corresponding to the level 2 of FIG. 5A in step 600, the first device 100 receives a second beacon signal 512 corresponding to the level 2 in step 610. Upon receiving the beacon signal 512, the first device 100 analyzes the beacon signal 512 and a level period. Since the first device 100 knows a level period in which the beacon signal 520 corresponding to the level 3 is received, the first device 100 enters a sleep mode in step 620 to wait for the beacon signal 520 corresponding to the level 3.

The first device 100 discards three beacon signals 513, 514, and 515 in steps 626, 630, and 635, respectively, until the beacon signal 520 corresponding to level 3 is received in a next period. Since the first device 100 enters the sleep mode, power is reduced. The first device 100 wakes up from sleep mode in step 640 to receive the beacon signal 520 corresponding to level 3 and then receives the beacon signal 520 corresponding to level 3 in step 645. Upon receiving the beacon signal 520 corresponding to level 3, the first device 100 has detailed information about the currently-used service, and determines in step 650 whether a network is connected by analyzing a detailed service of a device, which has transmitted the beacon signal 520.

Figure 7:
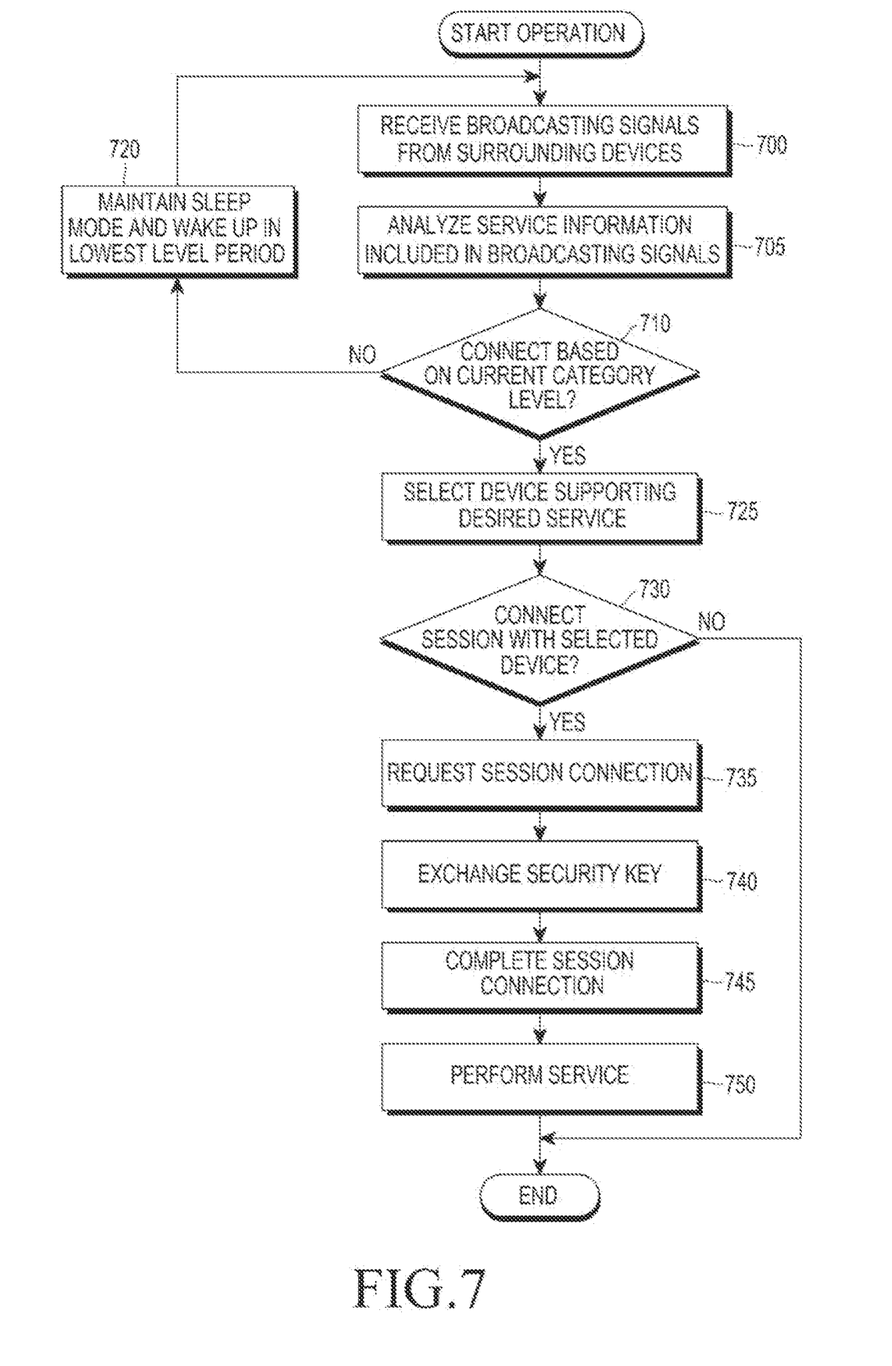
FIG. 7 illustrates a flowchart illustrating a process in a device according to the first embodiment of the present invention.

A process in the first device 100 according to the first embodiment of the present invention is described with reference to FIG. 7. FIG. 7 illustrates the process of searching, by the first device 100 supporting D2D in a service-based D2D network, for a device supporting a target service and forming a network with the searched device.

Referring to FIG. 7, when the first device 100 starts searching for a target service, the first device 100 receives broadcasting signals from nearby devices in step 700. Each broadcasting signal is received in a pre-defined period according to a scheduling method, and the first device 100 analyzes service information included in the broadcasting signals in step 705. The service analysis allows the first device 100 to know a level period and in what level of a service category table a currently-used service is transmitted.

In step 710, the first device 100 determines whether a connection is performed based on a current service category level. Whether a connection is performed based on the current service category level is determined by the following methods. Whether a connection is performed is determined according to a selection of a user of the first device 100. Alternatively, when the current service category level includes detailed service information corresponding to the lowest level, the process proceeds to step 725.

First, a method according to a selection of the user is described.

If a broadcasting signal includes providing intention for a service category table, a currently-used service is provided based on the service category table as shown in Table 1 or 2. For example, if it is determined in step 705 that the current service category level corresponds to the level 2, the user of the first device 100 knows based on the broadcasting signal that a corresponding device supports any one of level-2 services, such as messaging, call, and traffic service. Accordingly, when the user desires to simply use a messaging service regardless of messaging service types, such as SMS, MMS, and IM, the user selects that a service is connected based on the current service category level. Since the first device 100 does not have to wait until detailed service information, i.e., service information corresponding to level 3 that is the lowest level, is received, a quicker service connection is achieved.

Next, a method based on an automatic selection is described.

If it is determined in step 705 that the current service category level corresponds to level 3 that is the lowest level, the first device 100 knows detailed services corresponding to level 3, such as SMS, MMS, and IM. A connection is automatically performed based on the current service category level.

If a connection is not performed based on the current service category level in step 710, for example, if it is determined that a lower level belonging to the current service category level exists or if the user does not select a connection based on the current service category level, the process proceeds to step 720. If it is determined that a lower level belonging to the current service category level exists, since the first device 100 knows a next period of the lower level through the analysis result, the first device 100 maintains sleep mode and wakes up in the next period of the lower level in step 720 and proceeds back to step 700 to wait for a next broadcasting signal.

In step 725, the first device 100 selects a device supporting a desired service, e.g., service A. Although FIG. 2 illustrates a case in which a device supporting service A is searched for by using a broadcasting signal when an application of service A is executed, if an application is executed without specifying one D2D service, the user selects a desired service from among a list of all services currently being used in each device by using a broadcasting signal. To this end, the first device 100 displays a list of services searched from the nearby devices on the user interface 410 of the first device 100 based on the analyzed service information to allow the user to select a desired service from the displayed service list.

Accordingly, the user of the first device 100 selects a desired specific service from among various kinds of services classified based on service types or portal sites. Moreover, when detailed service information is provided, the user selects a desired service from a service list currently available by devices, which has transmitted broadcasting signals, thereby increasing a chance of service selection.

In step 730, the first device 100 determines whether a session is connected with the selected device. If a session is connected with the selected device, the first device 100 requests the selected device for a session connection in step 735 and exchanges a security key with the selected device in step 740. A session connection in which security is guaranteed is then completed in step 745. Accordingly, the desired service is performed in step 750.

When security information, such as a security key, is exchanged, a network established between two devices is secure, so one device may provide information to the other device after a session is connected between them for a service connection. Additionally, the information provided when the desired service is performed includes, for example, IDs of a service user, which are actually used in a D2D network, such as a NAVER ID and a game ID. If a device different from the D2D technology supports another communication protocol, connection information includes information regarding whether another communication protocol is supported, and in this case, a Wi-Fi/Bluetooth (BT) connection is also be possible, thereby providing information by means of Wi-Fi/BT.

Figure 8:
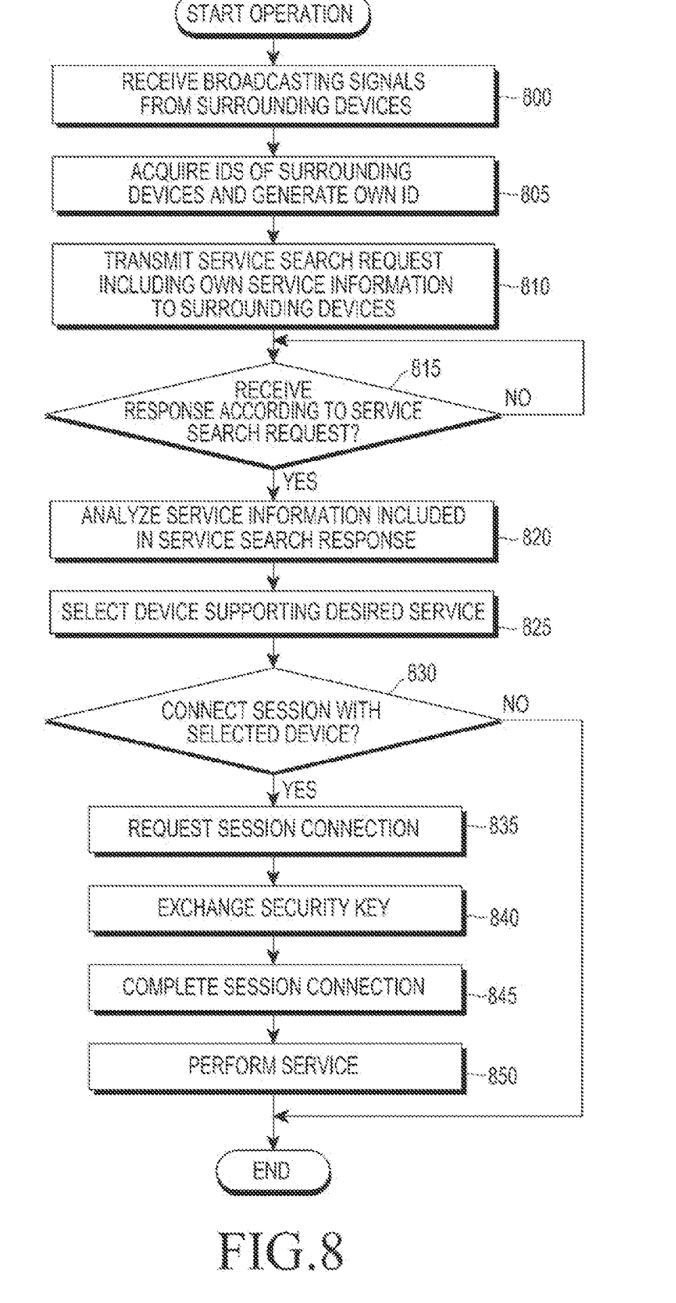
FIG. 8 illustrates a flowchart illustrating a process in a device according to the second embodiment of the present invention.

FIG. 8 is a flowchart illustrating a process in the first device 100 according to the second embodiment of the present invention. Since steps 825 to 850 of FIG. 8 are the same as steps 725 to 750 of FIG. 7, a detailed description thereof is omitted. However, FIG. 8 is different from FIG. 7 in that the first device 100 acquires ID information by using broadcasting signals, i.e., beacon signals, received from nearby devices and then generates unique ID information of the first device 100, which is different from ID information of nearby devices, in steps 800 and 805. After generating the ID information of the first device 100, the first device 100 transmits a service search request including service information of the first device 100 to the nearby devices in step 810. In step 815, the first device 100 determines whether a response according to the service search request is received. In step 820, the first device 100 analyzes service information included in the service search response. Unlike in FIG. 7, since the first device 100 has already informed other devices of the service information supported by the first device 100, the service search response is preferably received from devices supporting the informed service.

As is apparent from the foregoing description, nearby devices are efficiently searched for based on a desired service in a system supporting D2D communication. Additionally, an optimized session connection process can be performed without connecting a session with all devices in a D2D network, i.e., by connecting a session with only a device providing a desired service, efficient management is performed in terms of the total network capacity, and in particular, a time taken to connect a session can be reduced.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A first device for searching for a second device, the first device comprising:
   a connection unit configured to receive, a first broadcasting signal including first available service information of the second device and period information; and
   a controller configured to:
      if the first available service information of the second device is the desired service information, establish a session with the second device based on the received first available service information, or
      if the first available service information of the second device is not the desired service information,
         identify the period information indicating a transmission timing of a second broadcasting signal, and
         receive a second broadcasting signal comprising second available service information based on the identified period information.

2. The first device of claim 1, wherein the first available service information further includes at least one of temporary identification information of the second device, a name of a currently-used service, version information of a service category table, and intention information for the service category table in the second device.

3. The first device of claim 2, wherein the service category table stores services supportable by the second device, which are classified based on service types.

4. The first device of claim 3, wherein the service types are hierarchically classified in an order of the first level corresponding to service information, second level corresponding to service information detailed more than the first level of the service information, and third level corresponding to service information detailed more than the second level of the service information.

5. The first device of claim 4, wherein the controller is further configured to determine whether a service corresponding to the first level of the service category table is included in the first available service information, based on the result of the analysis of the first available service information included in the first broadcasting signal, enter a sleep mode if the service corresponding to the first level of the service category table is included in the first available service information, and wake up if the second broadcasting signal including a service corresponding to the second level or the third level of the service category table is included in the second available service information is received.

6. A method of establishing a session with a second device, the method comprising:
   receiving, from the second device, a first broadcasting signal including first available service information of the second device and period information;
   determining whether the first available service information of the second device is desired service information; and
   if the first available service information of the second device is the desired service information, establishing a session with the second device based on the received first available service information, or
   if the first available service information of the second device is not the desired service information,
      identifying the period information indicating a transmission timing of a second broadcasting signal; and
      receiving a second broadcasting signal comprising second available service information based on the identified period information.

7. The method of claim 6, wherein the first available service information further includes at least one of temporary identification information of the second device, name information of a currently-used service, version information of a service category table, and intention information for the service category table in the second device.

8. The method of claim 7, wherein the service category table stores services supportable by the second device, which services are classified based on service types.

9. The method of claim 8, wherein the service types are hierarchically classified in an order of the first level corresponding to service information, second level corresponding to service information detailed more than the first level of the service information, and third level corresponding to service information detailed more than the second level of the service information.

10. The method of claim 7, wherein the service category table stores services supportable by the second device, which services are classified based on portal sites.

11. The method of claim 9, further comprising:
    determining whether a service corresponding to the first level of the service category table is included in first available the service information, based on a result of the analyzed first available service information included in the first broadcasting signal; and
    entering a sleep mode, if the service corresponding to the first level of the service category table is included in the first available service information.

12. The method of claim 11, further comprising:
    waiting in the sleep mode until second broadcasting signal including a service corresponding to the second level or the third level of the service category table is included in the second available service information is received; and waking up if the service corresponding to the second level or the third level of the service category table is included in the second available service information is received.

13. The first device of claim 1, wherein the controller is configured to:
   if the second broadcasting signal is received, determine whether the second available service information of the second device is desired service information, and
   if the second available service information of the second device is the desired service information, establish the session with the second device based on the received second available service information.

14. The method of claim 6, further comprising:
   if the second broadcasting signal having the second available service information is received, determining whether the second available service information of the second device is desired service information; and
   if the second available service information of the second device is the desired service information, establishing the session with the second device based on the received second available service.

* * * * *